(12) United States Patent
Ashworth et al.

(10) Patent No.: US 7,140,323 B2
(45) Date of Patent: Nov. 28, 2006

(54) REDUCING THE LEVEL OF BACTERIA AND VIRUSES IN AQUACULTURE

(75) Inventors: David Wilson Ashworth, Lowdham (GB); Angelika Benz, Romerberg (DE); Dieter Zeller, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 86 days.

(21) Appl. No.: 10/333,922

(22) PCT Filed: Jul. 25, 2001

(86) PCT No.: PCT/GB01/03344

§ 371 (c)(1),
(2), (4) Date: Mar. 8, 2004

(87) PCT Pub. No.: WO02/11528

PCT Pub. Date: Feb. 14, 2002

(65) Prior Publication Data

US 2005/0145564 A1    Jul. 7, 2005

(51) Int. Cl.
*A01K 61/00*    (2006.01)

(52) U.S. Cl. ..................................... 119/200
(58) Field of Classification Search ................. 119/200
See application file for complete search history.

(56) References Cited

U.S. PATENT DOCUMENTS

| | | | | |
|---|---|---|---|---|
| 3,551,566 A | * | 12/1970 | Masanao et al. ............ 514/336 |
| 4,880,602 A | * | 11/1989 | Al-Sioufi ..................... 422/28 |
| 5,206,243 A | * | 4/1993 | Hofmann et al. ......... 514/239.5 |
| 5,212,193 A | * | 5/1993 | Sherba et al. ............... 514/372 |
| 5,219,875 A | * | 6/1993 | Sherba et al. ............... 514/373 |
| 5,863,547 A | * | 1/1999 | Miner ........................ 424/405 |
| 6,040,283 A | * | 3/2000 | Miner ........................ 510/161 |
| 6,518,252 B1 | * | 2/2003 | Wooley et al. ................ 514/29 |
| 2002/0098208 A1 | * | 7/2002 | Wooley et al. .............. 424/400 |
| 2004/0232089 A1 | * | 11/2004 | Manzotti et al. ............ 210/764 |

OTHER PUBLICATIONS

L.L. Marking et al.: "Evaluation of antifungal agents for fish culture" Progressive Fish-Culturist, vol. 56, No. 4, pp. 225-231 Oct. 1994.

* cited by examiner

*Primary Examiner*—Peter M. Poon
*Assistant Examiner*—Bethany L Griles
(74) *Attorney, Agent, or Firm*—Oblon, Spivak, McClelland, Maier & Neustadt, P.C.

(57) ABSTRACT

A method of reducing the level of bacteria and viruses in a volume of water during aquaculture comprises:—(a) providing the volume of water to be stocked with farmed aquatic organisms or eggs thereof; (b) prior to the stocking, introducing into the water an aqueous solution of glutaraldehyde in an amount such as to provide in the water from 0.1 to 2 ppm of glutaraldehyde; (c) stocking the water with the farmed aquatic organisms or eggs thereof at a time when the concentration of glutaraldehyde is 0.1 to 2 ppm. (d) allowing the farmed aquatic organisms or eggs thereof to grow; and (e) optionally during a period of the growth, introducing into the water at least one further portion of an aqueous solution of glutaraldehyde in an amount such as to maintain the concentration of the glutaraldehyde at 0.1 to 2 ppm.

12 Claims, No Drawings

REDUCING THE LEVEL OF BACTERIA AND VIRUSES IN AQUACULTURE

This invention relates to a method of reducing the level of bacteria and viruses in a volume of water during aquaculture, especially shrimp farming.

More specifically the threat comes from virulent, difficult to treat viruses, for example Taura Syndrome Virus (TSV), Yellow Head Virus (YHV) and White Spot Syndrome Baculovirus (WSBV). Shrimp are also prone to diseases caused by bacteria such as *Vibrio parahaemolyticus*.

The above viruses all effect shrimp in the growing out stage of farming. TSV typically affects the shrimp *Litopenaeus vannamei* in its juvenile stage (0.1–5.0 g weight) within 2–4 weeks of stocking into grow out ponds. YHV especially affects shrimps in the late juvenile stage (5–15 g weight). WSBV is particularly virulent, often affecting early post larval stages, but equally capable of affecting shrimp in the later stages of culture. These viruses are examples of the better characterised pathogens. A large number of viral pathogens have been described which have damaging effects on shrimp yields.

For controlling the growth of ectoparasites (protozoa) during shrimp farming in tanks it is known to add to the tank 2.5 ppm of glutaraldehyde; see Conference paper, 8th Scientific Compress, Faculty of Veterinary Medicine, Assuit University, Egypt, 15–17 Nov. 1998. However, in this paper, the use of formalin was preferred.

Fitzpatrick et al, Progressive Fish-Culturist (1995), 57, 153–155, evaluated three candidate fungicides for treatment of adult spring chinook salmon, including glutaraldehyde, applied in respective amounts of 31.2 and 6.2 mg/l in a flow-through system. Although treatment with glutaraldehyde was regarded as showing promise, another alternative, hydrogen peroxide was recommended.

Articles by each of Salvesen et al, Aquaculture International (1997), 5, 249–258, and Olsen et al, Aquaculture (1999), 176, 3–13, disclose the disinfection of the eggs of Atlantic halibut and turbot with 400–1200 mg/l of glutaraldehyde. However, at such high levels, glutaraldehyde may be toxic to certain forms of aquatic life; again see Fitzpatrick et al where levels as low as 62 mg/l were toxic to spring chinook salmon.

We have now found surprisingly that a highly effective reduction in both viruses and bacteria harmful to aquatic life, especially those harmful to shrimps, can be obtained by application, to a pond in which farmed aquatic organisms and eggs thereof are to grow, of very low concentrations of glutaraldehyde.

Thus, the invention provides a method of reducing the level of bacteria and viruses in a volume of water during aquaculture, which method comprises:
(a) providing the volume of water to be stocked with farmed aquatic organisms or eggs thereof;
(b) prior to the stocking, introducing into the water an aqueous solution of glutaraldehyde in an amount such as to provide in the water from 0.1 to 2 ppm of glutaraldehyde;
(c) stocking the water with the farmed aquatic organisms or eggs thereof at a time when the concentration of glutaraldehyde is 0.1 to 2 ppm.
(d) allowing the farmed aquatic organisms or eggs thereof to grow; and
(e) optionally during a period of the growth, introducing into the water at least one further portion of an aqueous solution of glutaraldehyde in an amount such as to maintain the concentration of the glutaraldehyde at 0.1 to 2 ppm.

Preferably, the concentration of glutaraldehyde used in each of steps (b), (c) and (e) is within the range 0.5 to 1.5 ppm.

The method is especially suitable for reducing the level of bacteria, especially the *Vibrio* spp, in particular, *Vibrio parahaemolyticus* and *Vibrio harveyi*.

The method is also especially suitable for reducing the level of White Spot Syndrome Baculovirus (WSBV) complex, (also known as China Virus) e.g. HHNBV; RV-PJ and SEMBV Yellow Head Virus (also known as Hua Leung) and Taura Syndrome Virus.

The method is especially suitable for the farming of crustacean especially shrimps or prawns, eggs thereof, for example *Litopenaeus vannamei, Litopenaeus setiferus, Litopenaeus stylirostris, Litopenaeus aztecus, Litopenaeus chinensis, Litopenaeus duorarum, Penaeus monodon* and, especially *Penaeus vannamei* (Black Tiger Shrimps).

It is preferred, during a period of growth to introduce into the water at least one further portion of an aqueous solution of glutaraldehyde in an amount such as to maintain the concentration of the glutaraldehyde at 0.1 to 2 ppm.

More preferably, at least two portions of the glutaraldehyde are introduced into the water, with an interval of from 5 to 10 days between respective additions thereof.

In addition to step (e), it is preferred to provide a further final period of growth, more preferably at least thirty days, during which no further glutaraldehyde is added.

The aquaculture is most preferably carried out using a sealed aerated pond and is also most preferably carried out in a marine environment.

Thus, by treating the water of a grow-out pond with from 0.1 to 2 ppm of glutaraldehyde, any opportunist pathogen present may be controlled and the yield of a shrimp or prawn farming operation dramatically improved, as later demonstrated. Likewise, it is also possible to utilize the method in the farming of other crustaceans, shellfish and fish.

The glutaraldehyde is preferably administered as a 50% solution thereof in water, a convenient form which is commercially available.

The pond is treated with glutaraldehyde prior to stocking. The amount of glutaraldehyde to be used will differ from pond to pond depending on size and depth. It is recommended that 20 kg of a 50% aqueous solution of glutaraldehyde are added per hectare per metre of depth (i.e. at a glutaraldehyde concentration of 1 ppm).

The correct amount of product should be evenly distributed throughout the pond using a suitable means of dispersion. It is acceptable to make a pre-dilution even of the 50% aqueous solution, in water prior to dispersion.

Once the pond is stocked, the glutaraldehyde may be added, at 20 kg/ha/metre depth, once each week, for a maximum of twelve weeks.

Treatment is preferably stopped 30 days prior to harvesting the shrimp.

The above recommendations can be used as a general guide. Local conditions such as sea temperature, climate and pond water composition may affect the efficacy.

It is recommended that the health of the shrimp is checked regularly to ascertain that there are no adverse effects.

Preferred embodiments of the invention will now be described in more detail with reference to the following Example.

EXAMPLE

Two ponds were chosen in the Far East.

Pond number 1 had an area of 6000 m² and a depth of 1 metre. It was stocked at a level of 30 post-larvae/m² and therefore regarded as simulating intensive farming.

Pond number 2 had an area of 7000 m² and also a depth of 1 metre. It was stocked with 10 post-larvae/m² and therefore considered as representative of semi-intensive farming.

A 50% aqueous solution of glutaraldehyde as active ingredient was added to each pond prior to stocking and treated on 30 days out of the 107 days prior to harvest.

The target dose for each treatment was 1.0–1.4 ppm of the aqueous solution (i.e. 0.5–0.7 ppm glutaraldehyde), which amounts to 10–14 kg aqueous solution/ha/metre depth (1 ha=10,000 m²). In this manner, apart from the last 30 days before harvest, the concentration of glutaraldehyde was maintained within the range 0.5–0.7 ppm.

The results of this study are shown in Table 1 below.

Results

TABLE 1

Yield (tonnes/ha. equivalent) from test ponds following treatment with glutaraldehyde solution (GDA)

| Pond | Area (m²) | Depth (m) | Stock (Post-larvae/m²) | Water treatment | Treatment Length (days) | Target (ppm) | Dose [kg/ha] | Yield (Tonnes/ha) |
|---|---|---|---|---|---|---|---|---|
| Pond 1 | 6000 | 1 | 30 | GDA | 30 | (1.0–1.4) | [10–14] | 7 |
| Pond 2 | 7000 | 1 | 30 | GDA | 30 | (1.0–1.4) | [10–14] | 1.36 |

The yield from Pond 1 (intensive) was 4.2 tonnes in 107 days from 6000 m², a yield equivalent to 7 tonnes/ha.
The yield from Pond 2 (semi-intensive) was 0.95 tonnes in 107 days from 7000 m² equivalent to 1.36 tonnes/ha.
Note:
The normal yield of semi intensive scale farming in Vietnam is about 0.7 tonnes/ha.

From the above study it can be seen that, even at concentrations as low as 0.5–0.7 ppm, glutaraldehyde (as active ingredient) showed a highly beneficial effect in treating and preserving the water against harmful diseases on a shrimp farm.

The method enables efficient pond management, which may start with a clean unstocked pond which has been treated with glutaraldehyde to reduce the risk of disease. Hygienic water treatment with glutaraldehyde will help prepare the water for introduction of post-larval stage shrimp. It can be used to control pathogens at levels which are not harmful to these shrimp.

It is possible, using the method to ensure that the microbial population of the pond is controlled throughout the growing season. This is desirable because micro-organisms may be latent, or introduced by the mechanics of the farming process. The method of the invention can be safely used throughout the season helping to reduce this risk.

When used correctly, a method in accordance with the invention is unlikely to be harmful to the shrimp while providing an excellent margin of safety for the consumer.

The invention claimed is:

1. A method of reducing the level of bacteria of the species *Vibrio* and viruses selected from the group consisting of White Spot Syndrome Bacilovirus (WSBV) complex, Yellowthread Virus, Taura Syndrome Virus and combinations thereof in a volume of water during aquaculture, which method comprises:
    (a) providing the volume of water to be stocked with farmed crustacea or eggs thereof;
    (b) prior to the stocking, introducing into the water an aqueous solution of glutaraldehyde in an amount such as to provide in the water from 0.5 to 2 ppm of glutaraldehyde;
    (c) stocking the water with the farmed crustacea or eggs thereof at a time when the concentration of glutaraldehyde is 0.5 to 2 ppm;
    (d) allowing the farmed crustacea or eggs thereof to grow; and
    (e) optionally during a period of the growth, introducing into the water at least one further portion of an aqueous solution of glutaraldehyde in an amount such as to maintain the concentration of the glutaraldehyde at 0.5 to 2 ppm.

2. The method according to claim 1, wherein the concentration of glutaraldehyde in each of steps (b), (c) and (e) is within the range 0.5 to 1.5 ppm.

3. The method according to claim 1, wherein the bacteria of the species *Vibrio* are selected from the group consisting of *Vibrio parahaemolyticus, Vibrio harveyi* and combinations thereof.

4. The method according to claim 1, wherein the viruses are WSBV complexes selected from the group consisting of HABV; RV-JP; SEMBV and combinations thereof.

5. The method according to claim 1, wherein the crustacea or eggs thereof are shrimps, prawns or eggs thereof.

6. A The method according to claim 1, wherein the crustacea are selected from the group consisting of *Litopenaeus vannamex, Litopenaeus setiferus, Litopenaeus stylirostris, Litopenaeus aztecus, Litopenaeus chinensis, Litopenaeus duorarurn, Penaeus monodo, Panaeus vannamei* and combinations thereof.

7. The method according to claim 1, which includes the step (e).

8. The method according to claim 7, wherein at least two portions of the glutaraldehyde are introduced into the water, with an interval of from 5 to 10 days between respective additions thereof.

9. The method according to claim 1, which includes, in addition to step (e), a further final period of growth during which no further glutaraldehyde is added.

10. The method according to claim 9, wherein the said further final period is at least thirty days.

11. The method according to claim 1, which is carried out using a sealed aerated pond.

12. A The method according to claim 1, which is carried out in a marine environment.

* * * * *